June 24, 1958  J. H. ARNOLD  2,840,149
APPARATUS FOR PARTIAL COMBUSTION OF GASIFORM HYDROCARBONS
Filed Oct. 20, 1951
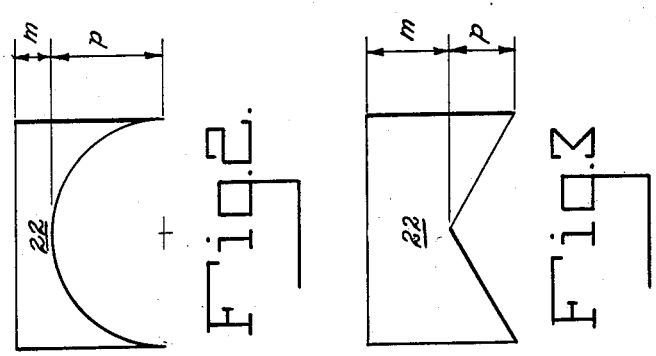
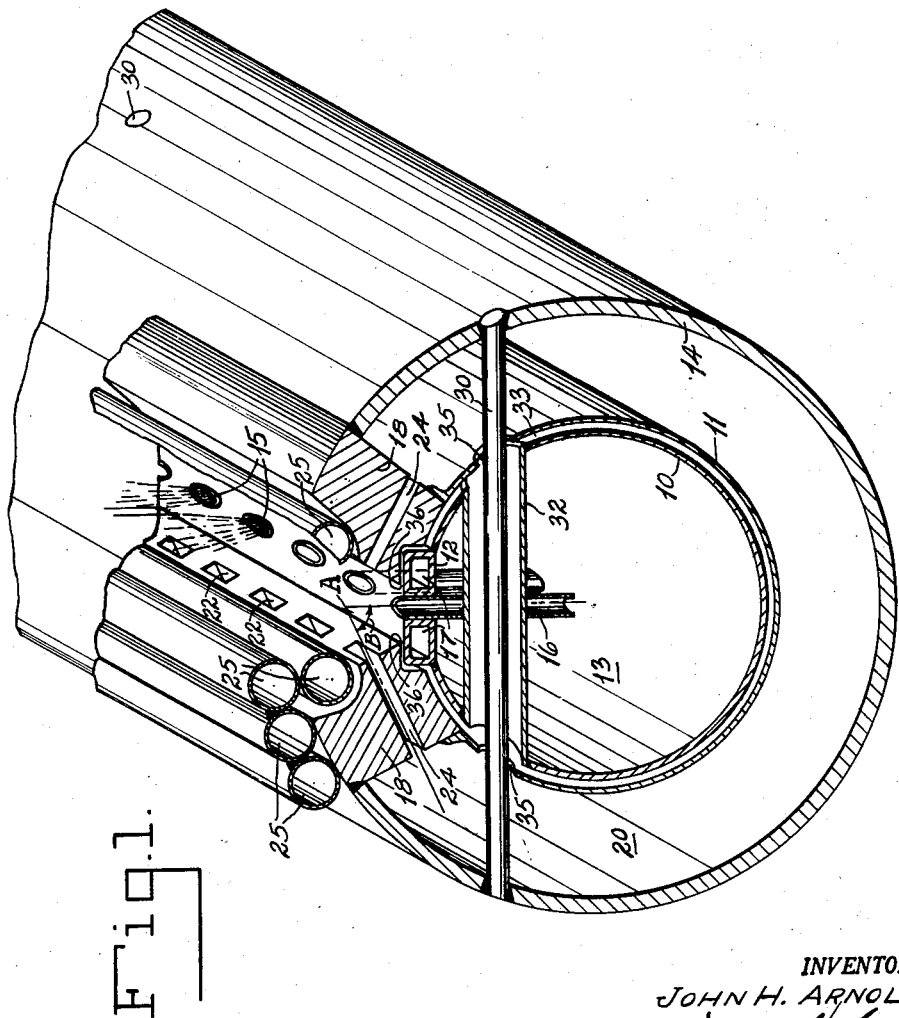
INVENTOR.
JOHN H. ARNOLD
BY
ATTORNEYS

2,840,149

APPARATUS FOR PARTIAL COMBUSTION OF GASIFORM HYDROCARBONS

John H. Arnold, Summit, N. J., assignor to Hydrocarbon Research, Inc., New York, N. Y., a corporation of New Jersey Application October 20, 1951, Serial No. 252,320

4 Claims. (Cl. 158—99)

This invention relates to an apparatus for the production of synthesis gas comprising essentially carbon monoxide and hydrogen by the partial combustion of a gasiform hydrocarbon. The invention is particularly suitable for the partial combustion of a gaseous hydrocarbon with oxygen enriched air or substantially pure oxygen to produce a mixture of carbon monoxide and hydrogen, and in one of its more specific aspects, relates to an apparatus for the partial combustion of a fuel gas, such as natural gas, with substantially pure oxygen.

In the manufacture of synthesis gas comprising predominantly carbon monoxide and hydrogen, a hydrocarbon fuel is caused to react with oxygen enriched air or with relatively pure oxygen at elevated temperatures in the range of 2000 to 3000° F. and at atmospheric pressure or elevated presesures up to as high as 500 p. s. i. g. The synthesis gas mixture of carbon monoxide and hydrogen, which is produced by this partial combustion operation, is particularly useful for the manufacture of synthetic fuels by the so-called Fischer-Tropsch reaction or for other reactions in which synthetic hydrocarbons or chemicals of commercial importance can be produced by the reaction of carbon monoxide with hydrogen.

To be most useful for such reactions, it is important that the synthesis gas consist predominantly of carbon monoxide and hydrogen and that it contain a minimum of unreacted feed hydrocarbon, by-product carbon dioxide, water vapor and elemental carbon. In order to realize these desiderata, it is important that rapid and adequate mixing of the hydrocarbon and oxygen reactants be insured and that the reaction be conducted at relatively high temperatures. The present invention provides not only a new and novel burner assembly for mixing the reactant gases and effecting the partial combustion but also discloses certain critical process conditions which should be observed in the operation of the burner assembly if synthesis gas of the desired quality is to be produced.

It has been found that if rapid and adequate mixing of reactants is not provided, a serious loss in combustion efficiency results and substantial portions of the hydrocarbon feed will pass through the burner assembly and partial combustion zone without undergoing reaction. Also, if the mixing is not rapid and complete, thermal cracking of the hydrocarbon will occur on the hot burner assembly with the production of elemental carbon which interferes with subsequent use of synthesis gas and which carbon is often deposited on the burner itself in such a manner that it interferes with mixing of the reactants, cooling of the burner, and conduct of the partial combustion, ofter resulting in failure of the burner after a relatively short operating period. Inadequate mixing may also result in excessive concentrations of oxygen in localized areas of the combustion zone with subsequent overheating and deterioration of the metal surfaces of the burner assembly or in the production of excessive amounts of by-product carbon dioxide and water.

At the high reaction temperatures employed in the partial combustion of a hydrocarbon with oxygen, the rate at which the reaction proceeds is dependent primarily on mixing. Although all of the theory underlying mixing is not clearly understood and, consequently, the present invention should in no way be circumscribed by the discussion of mixing theory which follows, it appears that mixing takes two forms. First, crude mixing is accomplished by contacting the reactant streams. The degree of this type of mixing is dependent upon the manner in which the two streams are contacted and the turbulence of the two streams prior to meeting and the turbulence induced immediately after mixing. It is desirable to have the turbulence before mixing "fine grain," that is, to have the average diameter of the vortex, which form the gaseous reactant streams assume when passing through the conduit leading to the mixing zone, as small as possible. The mixture which results from this initial contacting of the reactant streams will then consist of relatively small molecular groupings or islands of each component.

These islands may be so small that the usual sampling techniques will indicate a homogeneous mixture. To complete the mixing, the second type of mixing which involves molecular diffusion must then take over. Since the speed of diffusion is an inverse function of the distance between the diffusing molecules, it is desirable to have the islands as small as possible when diffusion takes over. Also, since diffusion is a direct function of the cross section of contact between the diffusing reactants, it is desirable to have the largest possible cross section for diffusion consistent with small distances between islands. The size of the islands is a direct function of the diameter and length of the conduit in which the "fine grain" turbulence is developed.

On the basis of the above, I have developed a burner assembly wherein the conduits in which the turbulence of the streams is developed and the ports through which the reactants pass are less than ½ inch and preferably less than ¼ inch in diameter and the length of the conduits are at least ten times the diameter of the conduit and preferably fifty times. Also, one reactant stream flows essentially in the direction of the effluent of the burner assembly and the other reactant stream is directed toward the first at an angle of 30 to 90°, preferably 40 to 70°, the angle to be measured at the intersection between the planes containing the flow axes of the streams. In addition, the first reactant stream is ejected from a plurality of ports with sufficient space between ports so that the second stream will contact the first stream on all sides, thereby insuring maximum interfacial contact between the two reactants so that maximum cross section is available for molecular diffusion.

From the foregoing it is obvious that an object of this invention is to provide a novel burner assembly or mixer for the partial combustion of gasiform hydrocarbons with oxygen enriched air or oxygen to produce carbon monoxide and hydrogen. Another object of this invention is to provide a burner assembly which is relatively simple in construction and which insures adequate mixing of the reactant gases. A further object of the invention is to provide a burner assembly which will produce mixtures of carbon monoxide and hydrogen by the partial combustion of a gaseous hydrocarbon with oxygen enriched air or oxygen without the concomitant production of excessive quantities of carbon dioxide, water vapor or free carbon. Still another object is to provide an apparatus for the partial combustion of a gaseous hydrocarbon with oxygen enriched air or oxygen to produce a synthesis gas comprising essentially carbon monoxide and hydrogen containing minimum quantities of unreacted hydrocarbon feed, carbon dioxide and water and substantially free of undesirable free carbon.

Other objects and advantages will be evident from the following specification and claims when considered in connection with the drawings attached hereto, wherein, Figure 1 is a cross sectional view in perspective of the burner assembly of this invention, Figures 2 and 3 are cross sectional views which show the form which the hydrocarbon ports of the burner assembly may take.

In brief, the burner of the present invention comprises a combustion channel in which are disposed a plurality of ports in the lower portion of said channel through which hydrocarbon and oxygen are separately introduced. The planes containing the flow axes of the hydrocarbon ports angularly intercept the plane containing the flow axes of the oxygen ports substantially beyond the outlets of the ports. Suitable passageways are provided for the introduction of the hydrocarbon and oxygen reactants to their respective ports, and ducts, through which cooling water is passed, are disposed about the combustion channel and face of the burner assembly to protect the metal surfaces from the elevated reaction temperatures.

For a detailed description of the burner assembly, see Figure 1, in which a conduit 10 is positioned concentrically of a shroud 11. Both the conduit 10 and the shroud 11 are positioned concentrically within a surrounding conduit 14. A cooled oxygen port bar 12 is disposed longitudinally along the wall of conduit 10 and forms the base of the combustion channel of the burner. The oxygen port bar 12 and conduit 10 encompass a chamber 13 which communicates with a plurality of oxygen ports 15, spaced along bar 12, by means of a corresponding number of passageways 16. The oxygen port bar is also provided with two unrestricted longitudinal passages 17 through which a cooling medium such as water, may be circulated.

A pair of spaced hydrocarbon port bars 18 form the sidewalls of the combustion channel and extend longitudinally along the edges of the oxygen port bar. A longitudinal segment is cut away from the walls of the shroud 11 and the conduit 14 to accommodate the combustion channel and the hydrocarbon and oxygen port bars. The hydrocarbon port bars join the edges of the conduit 14 and shroud 11 to form a closed chamber 20 intermediate the walls of said conduit to which hydrocarbon gas is supplied from a suitable source, not illustrated in the drawing. The chamber 20 communicates with a plurality of hydrocarbon ports 22, disposed longitudinally along the hydrocarbon port bars, by means of passageways 24 in said hydrocarbon port bars. The hydrocarbon port bars are disposed at an angle such that the planes containing the flow axes of the hydrocarbon ports angularly intercept the plane containing the flow axes of the oxygen ports substantially beyond the outlets of said ports, as designated on the drawing by the letter A. To insure adequate mixing, the angle B formed by these intercepting axes should not be less than 45° and not more than 90° and preferably within the range of 60 to 90°.

The hydrocarbon port bars 18 which form the sidewalls of the combustion channel are provided with a plurality of cooling ducts 25 which extend longitudinally along said bars and combustion channel. Any suitable cooling medium, such as water, steam, Dowtherm and the like, may be circulated through these cooling ducts.

Spacing of conduit 10 and shroud 11 within conduit 14 is effected by means of a rod 30 which extends transversely across the upper section of conduit 14, and a tube 32 which extends transversely across the upper section of conduit 10 and is disposed concentrically about rod 30. Rod 30 prevents the conduit 14 from any transverse expansion under the pressure of the gases passing through said conduit while tube 32, by virtue of its association with rod 30, positions inner conduit 10 within shroud 11. Sufficient clearance in the form of an annular chamber 33 is provided between conduit 10 and shroud 11 so that the former floats freely in the latter but is restrained from any twisting or longitudinal movement by the combination of rod 30 and tube 32. A plurality of these rod and tube combinations are provided at suitably spaced intervals along the longitudinal axis of the burner assembly.

Chamber 20 communicates with annular chamber 33 by means of openings 35 in shroud 11, which openings are concentric with rod 30. Hydrocarbon gas in chamber 20 may pass freely through said openings into chamber 33 and thence into the burner combustion channel through slots 36 which are disposed longitudinally along both sides of the bottom of the combustion channel. Since the reactant gases supplied to chambers 13 and 20 are usually at different temperatures, annular chamber 33 serves as a cushion chamber to accommodate the differential thermal expansion of conduit 10 and shroud 11. As expansion or contraction of conduit 10 and shroud 11 alters the volume of chamber 33, the hydrocarbon gases in chamber 33 have free ingress and egress to said chamber through openings 35 and slots 36. By permitting conduit 10 to float in this annular chamber 33, any stresses due to differential thermal expansion of conduit 10 and shroud 11 are eliminated. Only a very small percentage, not exceeding 2% and usually less than 0.5%, of the total hydrocarbon gas supplied to chamber 10 enters the combustion channel through slots 36, the bulk of the hydrocarbon gas entering the combustion channel by means of the passageways 24 and ports 22.

In Figure 1, the hydrocarbon ports 22 have the form of rectangles and are spaced along hydrocarbon port bars 18 so that the issuing hydrocarbon streams impinge directly on the oxygen streams issuing from oxygen ports 15. Since it is essential for good mixing of the reactant streams that the oxygen stream be completely surrounded by the hydrocarbon stream, the major portion of the hydrocarbon stream should preferentially be directed at the periphery of the oxygen stream. By the use of ports having the preferred forms indicated in Figures 2 and 3, the major portion of the hydrocarbon stream issues from the port along its edges thereby materially assisting in enveloping the oxygen stream with the hydrocarbon reactant.

In Figure 2 the hydrocarbon port 22 has the form of a rectangle from the base of which a semicircular section is removed. This semicircular section has a diameter equal to the base from which it is removed. In order to insure proper flow distribution through this shape of hydrocarbon port, it is also important that the diameter of the semicircular section removed be not less than 80% and not more than 133% of the height of the rectangle. This limitation on the diameter of the semicircular section insures a flow pattern through the hydrocarbon port wherein the bulk of the hydrocarbon gas issues from the hydrocarbon port around its edges.

Figure 3 shows another form of hydrocarbon port somewhat similar to that of Figure 2. This latter port has the form of a rectangle from the base of which an isosceles triangle section has been removed. This triangular section has a base equal to the length of the base of the rectangle from which it has been removed and an altitude which is not less than 40% and not more than 67% of the length of the height of the rectangle. These limitations on the dimension of the triangular section which has been removed from the rectangle insure the desired flow distribution through the hydrocarbon ports. These hydrocarbon ports are positioned in the combustion channel so that the diameter of the semicircular section and the base of the triangular section are perpendicular to the axes of the oxygen ports.

The limitations on dimension of the semicircle and triangle removed from the rectangles to form the hydrocarbon ports depicted in Figures 2 and 3 may also be expressed by stating that the dimension $m$, indicated in both Figures 2 and 3, is at least 50% and not greater than 150% of dimension $p$ likewise indicated in both Figures 2 and 3.

In Figure 1, the hydrocarbon ports 22 are shown arranged longitudinally along the hydrocarbon port bars so that the streams issuing therefrom impinge directly on the streams issuing from the oxygen ports 15. By the use of hydrocarbon ports of the preferred forms shown in Figures 2 and 3, it is obvious that the bulk of the hydrocarbon stream is directed at the periphery of the oxygen stream, and only a minor proportion of the hydrocarbon stream is directed at the center of the oxygen stream. This same situation prevails, however, when the hydrocarbon ports along both hydrocarbon port bars are arranged so that the hydrocarbon streams are directed into the spaces between adjacent oxygen streams. In this case, also, the bulk of the hydrocarbon stream is directed at the periphery of the oxygen stream, and the desirable envelopment of the oxygen stream with hydrocarbon reactant is realized. A plurality of rows of hydrocarbon and oxygen ports may be provided, preferably with the ports in adjacent rows arranged in alternating, or staggered relationship.

In the operation of the burner assembly described in this invention, the optimum results from the standpoint of synthesis gas composition and purity are realized when the relationship between gaseous flows through the hydrocarbon and oxygen ports is adjusted so that the kinetic energy of the hydrocarbon stream issuing from the hydrocarbon ports is not less than 1.5 and not more than three times the kinetic energy of the oxygen stream issuing from the oxygen ports and preferably is within the range of 1.8 to 2.2. The kinetic energy of either stream is equal to ½ of the product of the mass flowing through the port times the square of its velocity; hence, changes in the kinetic energy of either stream may be effected by altering the amount or mass of gas flowing through the ports, or by changing the velocity of the gas. Changes in velocity of flow are readily effected by increasing or decreasing the temperature or pressure of the flowing stream or by changing the size of the passageway and port through which such gas stream passes. By maintaining the aforesaid kinetic energy relationship between the reactant gases, the desired rapid and complete mixing is assured and optimum processing results are obtained.

The burner assembly may be of any suitable length and contain a sufficient number of oxygen and hydrocarbon ports to accommodate the required flow of reactants therethrough. In operation the burner is installed through the wall or floor of a suitable furnace which may be maintained under elevated pressures up to as high as 500 p. s. i. g. If desired, a plurality of these burners may be employed in the furnace disposed radially or in other pattern about the furnace floor. Preferably, the combustion channel is fabricated of Inconel, an alloy steel containing about 13% chromium, 79.5% nickel and 6.5% iron. The conduits supplying the gaseous reactants may be fabricated of 18—8 steel, which is an alloy of steel containing about 18% chromium and 8% nickel. The cooling tubes disposed about the upper part of the combustion channel and across the channel and face of the burner assembly may be of carbon steel since they are water cooled usually.

The burner assembly of this invention is particularly suited for the partial combustion of a hydrocarbon gas with oxygen to produce mixtures of carbon monoxide and hydrogen. By hydrocarbon gas is meant any gaseous mixture of hydrocarbons, particularly natural gas which is comprised predominantly of methane with minor amounts of heavier hydrocarbons such as ethane, propane and the like. The oxygen reactant may be oxygen enriched air which contains about 45% oxygen or may be relatively pure oxygen of 80 to 99.5% purity, with nitrogen being the principal diluent. Mixtures of oxygen and nitrogen containing from 45% to 99.5% oxygen are suitable.

When producing synthesis gas, the hydrocarbon gas and oxygen reactants are normally supplied so that the atoms of oxygen and atoms of carbon are in the ratio of from 1.0:1 to about 1.6:1. When the hydrocarbon gas is a typical natural gas and the oxygen gas is of high purity, the volumetric ratio of hydrocarbon gas to oxygen gas is in the range of from 2:1 to about 1.3:1. If oxygen enriched air is used, it is obvious that this ratio may be as low as 1:1, depending on the purity of the oxygen stream.

As indicated above, the reactants are usually supplied to the burner assembly at different temperatures. Either, or both reactant streams may be preheated externally of the burner assembly by suitable heat exchange with other hot streams or by passage through a fired preheater. Normally the hydrocarbon gas stream is preheated to temperatures in the range of from 400 to 1200° F. and in certain instances may be heated to even higher temperatures if thermal cracking thereof does not occur. Although the oxygen stream is quite reactive with the metal walls of the preheater or exchanger, it may be preheated to temperatures as high as 600° F. and even to temperatures as high as 1000° F. when suitable materials of construction are employed in the preheater and burner assembly.

As previously indicated the partial combustion reaction is conducted at temperatures of from 2000 to 3000° F. and at atmospheric pressure or elevated pressures up to 500 p. s. i. g. The reactants are supplied to the burner assembly so that linear velocities through the hydrocarbon and oxygen ports are in the range of from 75 to 375 ft./sec., preferably 100 to 250 ft./sec.

By way of illustrating the operation of this burner assembly, an example of a preferred embodiment of the invention follows. Natural gas comprising substantially methane with minor amounts of heavier hydrocarbons is preheated externally of the burner assembly to a temperature of 985° F. and introduced, by means not shown, in the drawing, to conduit 14 and chamber 20. Similarly, oxygen of 95% purity is preheated to a temperature of 500° F. and introduced, by means not shown, to conduit 10 and chamber 13. A ratio of one volume of hydrocarbon gas is supplied for each 6/10 volumes of oxygen.

The natural gas enters the combustion channel by means of passageways 24 and ports 22. The oxygen enters the combustion channel through passageways 16 and ports 15.

In the combustion channel, the reactant gases undergo rapid and complete mixing and partial combustion with the production of predominantly carbon monoxide and hydrogen at a temperature of 2400° F. takes place. The synthesis gas product which issues from the combustion channel has the following approximate composition:

| | Percent |
|---|---|
| CO | 31 |
| $H_2$ | 58 |
| $CH_4$ | 1 |
| $CO_2$ | 1 |
| $H_2O$ | 6 |
| $N_2$ | 3 |

The linear velocity of the hydrocarbon streams issuing from the hydrocarbon ports is 200 ft./sec. and the linear velocity of the oxygen streams issuing from the oxygen ports is 150 ft./sec. The kinetic energy of the hydrocarbon streams as they issue from the hydrocarbon ports is equal to twice that of the oxygen streams.

Obviously many modifications and variations of the invention as herein described may be made without departing from the sense and scope thereof and only such limitations should be imposed as are indicated in the appended claims.

I claim:

1. A burner assembly for effecting partial combustion of a gasiform hydrocarbon with an oxygen-containing gas to produce a gaseous product consisting essentially of carbon monoxide and hydrogen comprising an open-face combustion channel having a substantially flat bottom wall and outwardly flaring straight side walls, said bottom wall being part of cooling means hereinafter defined and having a plurality of ports formed therein arranged therealong for the introduction of said oxygen-containing gas, said side walls having a plurality of ports formed therein for the introduction of said gasiform hydrocarbon for admixture together with said oxygen-containing gas, means for defining individual passageways ending at said ports for supplying the respective reactant gases thereto, the flow axes of said passageways extending through said ports normal to the respective walls of said channel and lying in separate planes which intersect substantially beyond said ports, the angle of intersection between said planes containing said flow axes of said passageways being not less than 45° and not more than 90°, and cooling means disposed along the face of said bottom wall opposite the open-face of said channel, said ports in said bottom and side walls being not greater than ½ inch in diameter, and said passageways ending at said ports having a length at least 10 times said diameter.

2. A burner assembly as defined in claim 1 in which the cross section of said ports for introducing said hydrocarbon has the general form of a rectangle from the base of which an isosceles triangular section has been removed, said triangular section having a base equal to the length of said base of said rectangle and an altitude not less than 40% and not more than 67% of the height of said rectangle, said ports being positioned along said sides of said combustion channel with said base of said triangular section perpendicular to said flow axes of said passageways for introducing said oxygen-containing gas.

3. A burner assembly as defined in claim 1 having a first tubular duct extending parallel to said combustion channel as a manifold in communication with said individual passageways for supplying said oxygen-containing gas, and a second tubular duct disposed around and in spaced relation to said first tubular duct as a manifold in communication with said individual passageways for supplying said hydrocarbon.

4. A burner assembly as defined in claim 1 in which the cross section of said ports for introducing said hydrocarbon has the general form of a rectangle from the base of which a semicircular section has been removed, said semicircular section having a diameter equal to the length of said base and not less than 80% and not more than 133% of the height of said rectangle, said ports being positioned along said sides of said combustion channel with said diameter of said semicircular section perpendicular to said flow axes of said passageways for introducing said oxygen-containing gas.

References Cited in the file of this patent

UNITED STATES PATENTS

| | | |
|---|---|---|
| 131,044 | Wren et al. | Sept. 3, 1872 |
| 2,043,867 | Rava | June 9, 1936 |
| 2,365,942 | Crowe | Dec. 26, 1944 |
| 2,398,884 | Crowe | Apr. 23, 1946 |
| 2,435,638 | Shorter | Feb. 10, 1948 |
| 2,725,933 | Goucher | Dec. 6, 1955 |